(12) United States Patent
Creutz et al.

(10) Patent No.: US 7,407,991 B2
(45) Date of Patent: Aug. 5, 2008

(54) SILICONE FOAM CONTROL COMPOSITIONS COMPRISING A SILOXANE FLUID AND A MIXTURE OF GLYCEROL MONO/DI/TRIESTERS

(75) Inventors: Serge Creutz, Rocourt (BE); Guzman Nachon, Barcelona (ES); Houria Seghir, Nivelles (BE); Bertrand Michel, Nivelles (BE); Virginie Caprasse, Liege (BE); Louise Batchelor, Brussels (BE)

(73) Assignee: Dow Corning Corporation, Midland, MI (US)

( * ) Notice: Subject to any disclaimer, the term of this patent is extended or adjusted under 35 U.S.C. 154(b) by 66 days.

(21) Appl. No.: 10/521,416

(22) PCT Filed: Aug. 1, 2003

(86) PCT No.: PCT/EP03/09159

§ 371 (c)(1),
(2), (4) Date: Jan. 6, 2005

(87) PCT Pub. No.: WO2004/018073

PCT Pub. Date: Mar. 4, 2004

(65) Prior Publication Data

US 2005/0227903 A1    Oct. 13, 2005

(30) Foreign Application Priority Data

Aug. 16, 2002  (GB) .................................. 0219089.0

(51) Int. Cl.
*B01D 19/04*  (2006.01)
*C11D 9/36*  (2006.01)

(52) U.S. Cl. .................. 516/120; 516/117; 516/118; 516/123; 556/450; 510/222; 510/228; 510/343; 510/400; 510/466

(58) Field of Classification Search .............. 510/222, 510/228, 343, 400, 466; 516/117, 118, 120, 516/123; 556/450
See application file for complete search history.

(56) References Cited

U.S. PATENT DOCUMENTS

| 4,272,544 | A | * | 6/1981 | Cella et al. ................. 514/171 |
| 4,584,125 | A | * | 4/1986 | Griswold et al. ............ 516/119 |
| 4,609,490 | A | | 9/1986 | Itoh et al. ................... 252/358 |
| 4,719,034 | A | * | 1/1988 | Yamada et al. .............. 516/117 |
| 4,868,169 | A | * | 9/1989 | O'Laughlin et al. ......... 514/179 |
| 5,080,828 | A | | 1/1992 | Terae ......................... 252/358 |
| 5,238,596 | A | | 8/1993 | Smith ..................... 252/174.15 |
| 5,846,454 | A | * | 12/1998 | Koczo et al. .................. 516/11 |
| 6,610,752 | B1 | * | 8/2003 | Schmid et al. .............. 516/117 |
| 6,890,543 | B2 | * | 5/2005 | Minami et al. .............. 424/401 |
| 2001/0044475 | A1 | * | 11/2001 | Matsuzaki et al. ........... 516/100 |
| 2004/0116316 | A1 | * | 6/2004 | Michel et al. ............... 510/444 |
| 2004/0136941 | A1 | * | 7/2004 | Max et al. ................ 424/70.13 |
| 2005/0227903 | A1 | * | 10/2005 | Creutz et al. ................ 510/511 |
| 2005/0239908 | A1 | * | 10/2005 | Creutz et al. ................ 516/117 |

FOREIGN PATENT DOCUMENTS

| DE | 145 153 | | 11/1980 |
| DE | 197 31 615 | | 2/1998 |
| EP | 0 210 731 | | 3/1990 |
| EP | 0 516 109 | | 5/1995 |
| EP | 0 578 424 | | 12/2000 |
| EP | 1 070 526 | | 1/2001 |
| EP | 1 075 863 | | 2/2001 |
| EP | 1 075 864 | | 2/2001 |
| EP | 1075863 | * | 2/2001 |
| GB | 1 523 957 | | 9/1978 |
| GB | 1523957 | * | 9/1978 |
| GB | 1 576 326 | | 10/1980 |

* cited by examiner

Primary Examiner—Charles I Boyer
(74) Attorney, Agent, or Firm—Timothy J. Troy

(57) ABSTRACT

A foam control composition comprises a polydiorganosiloxane fluid comprising units of the formula

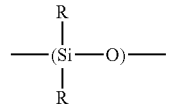

where each group R, which may be the same or different, is selected from an alkyl group having 1 to 36 carbon atoms or an aryl group or aralkyl group having up to 36 carbon atoms, the mean number of carbon atoms in the groups R being at least 1.3, and an additive composition having a melting point of at least 35° C. comprising 5-50 parts by weight of a nonpolar component (A) and 50-95 parts by weight of a component (B) which is miscible with component (A) and is more polar than component (A), at least one of (A) and (B) being miscible with the polysiloxane fluid.

13 Claims, No Drawings

SILICONE FOAM CONTROL COMPOSITIONS COMPRISING A SILOXANE FLUID AND A MIXTURE OF GLYCEROL MONO/DI/TRIESTERS

CROSS REFERENCES TO RELATED APPLICATIONS

The present application is a US national stage filing under 35 USC 371 and claims priority from PCT application No. PCT/EP03/09159 filed on Aug. 1, 2003 and GB application No. 0219089.0 filed on Aug. 16, 2002. The above applications are incorporated by reference in their entirety.

FIELD OF THE INVENTION

This invention is concerned with silicone-based foam control compositions for use in aqueous compositions which are liable to foam. The foam control compositions of the invention can be added to detergent compositions, particularly detergent powders, to inhibit excessive foaming when the detergent is used in washing.

In many aqueous systems which are used e.g. in food processes, textile dyeing, paper production, sewage treatment and cleaning applications, the production of foam needs to be controlled or prevented. It is important to keep the foam formation to an acceptable level when laundering is performed in automatic washing machines, especially front loading machines. Excessive foam would cause overflow of the washing liquor onto the floor as well as reduction in the efficiency of the laundering operation itself. There is a move in the detergent industry towards the use of detergent compositions which will perform to a higher efficiency than hitherto. There is a need to control foam from e.g. increased surfactant levels in the detergent compositions, use of surfactants which have a higher foam profile than traditional surfactants and changing laundering conditions. It is desirable to keep the addition level of foam control compositions to a minimum. There has therefore arisen a need to develop more efficient foam control compositions for incorporation into detergent compositions.

BACKGROUND TO THE INVENTION

EP-A-1075683 describes a foam control agent comprising (A) an organopolysiloxane material having at least one silicon-bonded substituent of the formula X-Ph, wherein X denotes a divalent aliphatic hydrocarbon group and Ph denotes an aromatic group, (B) a water-insoluble organic liquid, (C) an organosilicon resin and (D) a hydrophobic filler. The water-insoluble organic liquid (B) can for example be a mineral oil, liquid polyisobutene, isoparaffinic oil or vegetable oil. EP-A-1075684 describes a foam control agent of similar composition except that it does not contain water-insoluble organic liquid (B).

EP-A-578424 describes a foam control agent which contains an polydiorganosiloxane with alkyl side chains in which each alkyl side chain contains from 9 to 35 carbon atoms. The polydiorganosiloxane is used together with a finely divided hydrophobic particulate material, for example, hydrophobic silica, and optionally an MQ organosilicon resin. EP-A-1070526 describes such a foam control composition additionally comprising a stabilizing aid which is an organic compound having a melting point of from about 40 to 80° C., preferably a fatty acid, a fatty alcohol or an alkylphosphoric acid ester.

EP-A-210731 describes a particulate foam control agent comprising a silicone antifoam and an organic material having a melting point in the range 50-85° C. which comprises a monoester of glycerol and a 12-20 C fatty acid, for example glyceryl monostearate, optionally in self-emulsifying form. The glyceryl monostearate is said not to affect the effectiveness of the silicone antifoam when it is released into the washing liquor. U.S. Pat. No. 5,238,596 describes a particulate foam control agent comprising a silicone antifoam and an organic material having a melting point in the range 45-85° C. which is a fatty acid, fatty alcohol or a monoester of glycerol and a 12-20 C fatty acid, and a starch carrier.

GB-A-1523957 describes a foam control substance which comprises powdered or granular sodium tripolyphosphate, sodium sulphate or sodium perborate having on the surface thereof an organopolysiloxane antifoam agent which is at least partially enclosed within a mixture of a water insoluble wax having a melting point of 55-100° C. and a water insoluble emulsifying agent.

U.S. Pat. No. 4,609,490 describes a defoaming agent for bean curd manufacture which comprises not less than 90% glycerol fatty acid monoester with additives comprising a silicone which has defoaming activity and an inorganic substance such as calcium carbonate which has weak defoaming activity and can serve as a carrier.

EP-A-516109 describes a silicone defoamer comprising polydimethylsiloxane fluid, microparticulate silica, and polysiloxanes having vinyl and Si—H groups which are capable of reaction to form a crosslinked structure. The defoamer composition may contain a polyethylene glycol compound and a fatty acid ester compound to act as a surfactant.

There is still a need to provide more efficient foam control agents. We have now surprisingly found that if efficient foam control agents based on organopolysiloxane materials are combined with certain combinations of additives, an even more efficient foam control composition can be obtained.

SUMMARY OF THE INVENTION

A foam control composition according to the present invention comprises a polydiorganosiloxane fluid comprising units of the formula

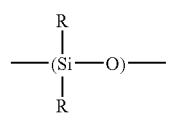

where each group R, which may be the same or different, is selected from an alkyl group having 1 to 36 carbon atoms or an aryl group or aralkyl group having up to 36 carbon atoms, the mean number of carbon atoms in the groups R being at least 1.3, and an additive composition having a melting point of at least 35° C. comprising 5-50 parts by weight of a non-polar component (A) and 50-95 parts by weight of a component (B) which is miscible with component (A) and is more polar than component (A), at least one of (A) and (B) being miscible with the polysiloxane fluid.

By 'miscible', we mean that materials in the liquid phase (i.e., molten if necessary) mixed in the proportions in which they are present in the foam control composition do not show phase separation. This can be judged by the clarity of the liquid mixture in the absence of any filler or resin. If the liquids are miscible the mixture is clear and remains as one phase. If the liquids are immiscible the mixture is opaque and separates into two phases upon standing.

DETAILED DESCRIPTION OF THE INVENTION

The polydiorganosiloxane fluid preferably has no more than 5 mole % branching units such as $RSiO_{3/2}$ units or crosslink sites, most preferably less than 2 mole % branching units. The mean number of carbon atoms in the groups R is preferably at least 1.7, and is most preferably at least 2.0 if the groups R include aryl or aralkyl groups and at least 2.5 if the groups R do not include aryl or aralkyl groups. The polydiorganosiloxane fluid is preferably free from non-silicone polymer chains such as polyether chains.

A preferred polydiorganosiloxane fluid can for example be a polysiloxane comprising at least 10% diorganosiloxane units of the formula

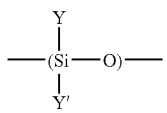

and up to 90% diorganosiloxane units of the formula

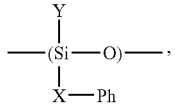

wherein X denotes a divalent aliphatic organic group bonded to silicon through a carbon atom; Ph denotes an aromatic group; Y denotes an alkyl group having 1 to 4 carbon atoms; and Y' denotes an aliphatic hydrocarbon group having 1 to 24 carbon atoms, as described in EP1075684. The diorganosiloxane units containing a —X-Ph group preferably comprise 5 to 40%, of the diorganosiloxane units in the fluid. The group X is preferably a divalent alkylene group having from 2 to 10 carbon atoms, most preferably 2 to 4 carbon atoms, but can alternatively contain an ether linkage between two alkylene groups or between an alkylene group and -Ph, or can contain an ester linkage. Ph is most preferably a phenyl group, but may be substituted for example by one or more methyl, methoxy, hydroxy or chloro group, or two substituents R may together form a divalent alkylene group, or may together form an aromatic ring, resulting in conjunction with the Ph group in e.g. a naphthalene group. A particularly preferred X-Ph group is 2-phenylpropyl —$CH_2$—$CH(CH_3)$—$C_6H_5$. The group Y' preferably has 1 to 18, most preferably 2 to 16, carbon atoms, for example ethyl, methyl, propyl, isobutyl or hexyl. Mixtures of different groups Y' can be present, for example a mixture of dodecyl and tetradecyl. Mixtures of alkyl groups Y' can be used. Other groups may be present, for example haloalkyl groups such as chloropropyl, acyloxyalkyl or alkoxyalkyl groups or aromatic groups such as phenyl bonded direct to Si.

The polysiloxane fluid containing —X-Ph groups may be a substantially linear siloxane polymer or may have some branching, for example branching in the siloxane chain by the presence of some tri-functional siloxane units, or branching by a multivalent, e.g. divalent or trivalent, organic or silicon-organic moiety linking polymer chains, as described in EP-A-1075684.

An alternative example of a preferred polysiloxane fluid is a polysiloxane comprising 50-100% diorganosiloxane units of the formula

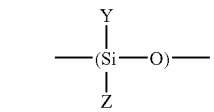

wherein Y denotes an alkyl group having 1 to 4 carbon atoms, preferably methyl or ethyl, and Z denotes an alkyl group having 6 to 18, preferably 6-12 carbon atoms, for example octyl, hexyl, heptyl or decyl. Such a polysiloxane fluid can optionally contain up to 50% diorganosiloxane units of the formula

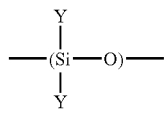

It is preferred that the number of siloxane units (DP or degree of polymerisation) in the average molecule of the polysiloxane fluid of either of the above types is at least 5, more preferably from 10 to 5000. Particularly preferred are polysiloxanes with a DP of from 20 to 1000, more preferably 20 to 200. The end groups of the polysiloxane can be any of those conventionally present in siloxanes, for example trimethylsilyl end groups.

The polysiloxane fluid containing —X-Ph groups, or the polysiloxane fluid containing -Z groups, is preferably present as at least 80% by weight of the polysiloxane fluid content of the foam control composition, most preferably as 100% or more than 95% of the polysiloxane fluid. The polysiloxane fluid containing —X-Ph groups, or the polysiloxane fluid containing -Z groups, can contain polydimethylsiloxane or another known silicone antifoam fluid, preferably at less than 20%, most preferably less than 5%, by weight of total polysiloxane fluid.

The polysiloxane fluid can alternatively be a polydiorganosiloxane in which the organic groups are substantially all alkyl groups having 2 to 4 carbon atoms, for example polydiethylsiloxane. Such polydiorganosiloxane fluids are however not preferred, since foam control agents based on them are less efficient in controlling foaming from modern detergent powders than those described in EP-A-1075684. The polydiorganosiloxane fluid should not consist wholly or mainly of polydimethylsiloxane (PDMS). Foam control agents based on them are less efficient in controlling foaming than those described in EP-A-1075684, and PDMS is immiscible with most organic materials, particularly those of melting point above 35° C.

The non-polar component (A) of the additive composition is preferably miscible with the polysiloxane fluid and is preferably a polyol ester, most preferably a polyol substantially fully esterified by carboxylate groups each having 7 to 36 carbon atoms. The polyol ester is preferably a glycerol triester or an ester of a higher polyol such as pentaerythritol or sorbitol, but can be a diester of a glycol such as ethylene glycol or propylene glycol, preferably with a fatty acid having at least 16 carbon atoms, for example ethylene glycol distearate. Examples of preferred glycerol triesters are glycerol tristearate, glycerol tripalmitate and glycerol triesters of saturated carboxylic acids having 20 or 22 carbon atoms such as the material of melting point 54° C. sold under the Trade Mark 'Synchrowax HRC'. Alternative suitable polyol esters are esters of pentaerythritol such as pentaerythritol tetrabehenate and pentaerythritol tetrastearate. The polyol ester can advantageously contain fatty acids of different chain length, which is common in natural products. Most preferably the polyol ester (A) is substantially fully esterified by carboxylate groups each having 14 to 22 carbon atoms. By "substantially fully esterified" we mean that for a diol such as ethylene glycol or a triol such as glycerol, at least 90% and preferably at least 95% of the hydroxyl groups of the polyol are esterified. Higher polyols, particularly those such as pentaerythritol which show steric hindrance, may be "substantially fully esterified" when at least 70 or 75% of the hydroxyl groups of the polyol are esterified; for example pentaerythritol tristearate has the effect of a fully esterified polyol ester (A).

The non-polar component (A) can alternatively be an ether, or can alternatively be a hydrocarbon wax, for example it can comprise at least one paraffin wax, optionally blended with microcrystalline wax, for example the wax sold under the Trade Mark 'Cerozo'. The non-polar component (A) preferably has a melting point of at least 25° C., more preferably at least 35° C., and most preferably a melting point in the range 45-100° C. The component (A) can comprise two or more materials, for example glyceryl tristearate and glyceryl tripalmitate, or glyceryl tristearate and Synchrowax HRC, or ethylene glycol distearate and Synchrowax HRC, can be used together with component (B) in the additive composition. Foam control compositions containing mixtures of two components (A) with component (B) in the additive composition may give even greater foam control efficiency.

The more polar component (B) of the additive composition usually contains groups more polar than the groups present in non-polar component (A), for example more polar than the carboxylate ester groups in a polyol ester (A). The more polar group preferably contains an active hydrogen atom, that is one liable to undergo hydrogen bonding. Examples of more polar groups are unesterified —OH groups (alcohol or phenol groups), unesterifed —COOH groups, amide groups or amino groups. The more polar component (B) preferably has a melting point of at least 25° C., more preferably at least 35° C., and most preferably a melting point in the range 45-100° C. Either of (A) and (B) may have a melting point below 25° C. provided that the mixture of (A) and (B) has a melting point of at least 35° C.

Examples of components (B) containing alcohol groups include long chain primary, secondary or tertiary alcohols including fatty alcohols, which are preferably saturated alcohols, ethoxylated fatty alcohols, ethoxylated fatty acids, ethoxylated alkyl phenols and partial esters of polyols. The alcohols preferably contain 8 to 32 carbon atoms such as lauryl alcohol, a branched C32 alcohol sold under the Trade Mark Isofol 32 believed to comprise 2-tetradecyloctadecanol, a branched C12 alcohol sold under the Trade Mark Isofol 12 believed to comprise 2-butyloctanol, a branched C20 alcohol sold under the Trade Mark Isofol 20 believed to comprise 2-octyldodecanol, or stearyl alcohol or behenyl alcohol. The ethoxylated fatty alcohols preferably contain 1 to 10 oxyethylene units and the alkyl group of the fatty alcohol preferably contains 16 to 24 carbon atoms, for example "Volpo S2" (Trade Mark) which is an ethoxylated stearyl alcohol containing an average of 2 oxyethylene units per molecule, or "Volpo CS5" (Trade Mark) which is an ethoxylated mixture of hexadecyl and stearyl alcohols having an average of 5 oxyethylene units per molecule, or a hydrogenated tallow alcohol ethoxylate. The ethoxylated fatty acids preferably contain 1 to 10 oxyethylene units and the alkyl group of the fatty acid preferably contains 14 to 24 carbon atoms. The ethoxylated alkyl phenols preferably contain 1 to 10 oxyethylene units and the alkyl group attached to the phenol nucleus preferably contains 6 to 12 carbon atoms, for example ethoxylated octylphenol or ethoxylated nonylphenol.

Partial esters of polyols useful as component (B) include monoesters or diesters of glycerol and a carboxylic acid having 8 to 30 carbon atoms, for example glycerol monostearate, glycerol monolaurate or glycerol distearate. Mixtures of monoesters and diesters of glycerol can be used. Partial esters of other polyols are also useful, for example propylene glycol monopalmitate, sorbitan monostearate, sorbitan monooleate or ethylene glycol monostearate.

Examples of components (B) containing phenol groups are alkyl phenols having one or more alkyl substituent and preferably containing a total of 6 to 12 carbon atoms in the alkyl substituent or substituents attached to the phenol nucleus, for example octylphenol or nonylphenol or di(t-butyl)phenol.

Examples of components (B) containing unesterified —COOH groups are fatty acids, preferably saturated acids, having 8 to 36 carbon atoms, for example stearic acid, palmitic acid, behenic acid or 12-hydroxystearic acid. Mixtures of fatty acids can be used. Examples of components (B) containing amide groups are monoamides of saturated or unsaturated fatty acids having 12 to 36 carbon atoms, for example stearamide or the amides sold under the Trade Mark 'Crodamide SR', 'Crodamide ER' (believed to be erucamide), 'Crodamide OR' (believed to be oleamide) and 'Crodamide BR' (believed to be behenamide). Examples of components (B) containing amino groups are alkyl amines having 8 to 30 carbon atoms such as 1-octylamine and 1-dodecylamine or stearylamine.

More than one component (B) can be used, for example a mixture of a glyceryl monocarboxylate and a glyceryl dicarboxylate or a mixture of either of these with an optionally ethoxylated fatty alcohol. The more polar component (B) is miscible with non-polar component (A) and may or may not be miscible with the polysiloxane fluid. The components (B) listed above containing amide groups are generally not soluble in the polysiloxane fluid. The alkylphenols are generally miscible with the polysiloxane fluid. The linear or branched long chain alkanols such as dodecanol, 2-butyloctanol and 2-octyldodecanol are generally miscible with the polysiloxane fluid, but the ethoxylated alcohols generally are not. The component (B) should be miscible with or stably dispersed in the mixture of polysiloxane fluid and non-polar component (A).

The proportions of the non-polar component (A) and the more polar component (B) can vary widely within the range 5-50 parts by weight of component (A) and 50-95 parts by weight of a component (B). For most combinations of (A) and (B) there is an optimum proportion for maximum foam control efficiency. For example, when component (A) is a fully esterified polyol such as a glycerol triester and component (B) contains unesterified alcohol groups, particularly when (B) is a partially esterified polyol, the ratio of (A) to (B) is preferably in the range 10:90 to 50:50 by weight, most preferably 15:85 to 30:70. The additive composition can for example comprise 10-50 parts by weight glycerol tristearate and 50-90 parts by weight glycerol monostearate.

The additive composition comprising (A) and (B) preferably has a melting point in the range 35 to 100° C. The additive composition is preferably present in the foam control composition at 10-200% by weight based on the polysiloxane fluid, most preferably 20 up to 100 or 120%.

The foam control composition preferably contains a hydrophobic filler dispersed in the polydiorganosiloxane fluid. The hydrophobic filler is not essential for washing at a temperature below the melting point of the additive composition, but is preferred for good foam control when washing at higher temperatures. Hydrophobic fillers for foam control agents are well known and are particulate materials which are solid at 100° C. such as silica, preferably with a surface area as measured by BET measurement of at least 50 m$^2$/g., titania, ground quartz, alumina, an aluminosilicate, an organic wax, e.g. polyethylene wax or microcrystalline wax, zinc oxide, magnesium oxide, a salt of an aliphatic carboxylic acids, a reaction product of an isocyanate with an amine, e.g. cyclohexylamine, or an high melting (above 100° C.) alkyl amide such as ethylenebisstearamide or methylenebisstearamide. Mixtures of two or more of these can be used.

Some of the fillers mentioned above are not hydrophobic in nature, but can be used if made hydrophobic. This could be done either in situ (i.e. when dispersed in the polysiloxane fluid), or by pre-treatment of the filler prior to mixing with the polysiloxane fluid. A preferred filler is silica which is made hydrophobic. Preferred silica materials are those which are prepared by heating, e.g. fumed silica, or precipitation. The silica filler may for example have an average particle size of 0.5 to 50 μm, preferably 2 to 30 and most preferably 5 to 25 μm. It can be made hydrophobic by treatment with a fatty acid, but is preferably done by the use of methyl substituted organosilicon materials such as dimethylsiloxane polymers which are end-blocked with silanol or silicon-bonded alkoxy groups, hexamethyldisilazane, hexamethyldisiloxane or organosilicon resins containing $(CH_3)_3SiOi_{1/2}$ groups. Hydrophobing is generally carried out at a temperature of at least 100° C. Mixtures of fillers can be used, for example a highly hydrophobic silica filler such as that sold under the Trade Mark 'Sipernat D10' can be used together with a partially hydrophobic silica such as that sold under the Trade Mark 'Aerosil R972'.

The amount of hydrophobic filler in the foam control composition of the invention is preferably 0.5-50% by weight based on the polydiorganosiloxane fluid, more preferably from 1 up to 10 or 15% and most preferably 2 to 8%.

The foam control composition preferably contains an organosilicon resin which is associated with the polydiorganosiloxane fluid. Such an organosilicon resin can enhance the foam control efficiency of the polysiloxane fluid. This is particularly true for polysiloxane fluids containing —X-Ph groups, as described in EP-A-1075684, and is also true for polysiloxane fluids containing -Z groups. In such polysiloxane fluids, the resin modifies the surface properties of the fluid. The additive composition comprising (A) and (B) is particularly effective when used in foam control compositions containing an organosilicon resin, and can markedly improve the foam control efficiency even from the highly efficient foam control agents described in EP-A-1075684.

The organosilicon resin is generally a non-linear siloxane resin and preferably consists of siloxane units of the formula $R'_aSiO_{4-a/2}$ wherein R' denotes a hydroxyl, hydrocarbon or hydrocarbonoxy group, and wherein a has an average value of from 0.5 to 2.4. It preferably consists of monovalent trihydrocarbonsiloxy (M) groups of the formula $R''_3SiO_{1/2}$ and tetrafunctional (Q) groups $SiO_{4/2}$ wherein R'' denotes a monovalent hydrocarbon group. The number ratio of M groups to Q groups is preferably in the range 0.4:1 to 2.5:1 (equivalent to a value of a in the formula $R'_aSiO_{4-a/2}$ of 0.86 to 2.15), more preferably 0.4:1 to 1.1:1 and most preferably 0.5:1 to 0.8:1 (equivalent to a=1.0 to a=1.33). The organosilicon resin (C) is preferably a solid at room temperature. The molecular weight of the resin can be increased by condensation, for example by heating in the presence of a base. The base can for example be an aqueous or alcoholic solution of potassium hydroxide or sodium hydroxide, e.g. a solution in methanol or propanol. A resin comprising M groups, trivalent $R''SiO_{3/2}$ (T) units and Q units can alternatively be used, or up to 20% of units in the organosilicon resin can be divalent units $R''_2SiO_{2/2}$. The group R'' is preferably an alkyl group having 1 to 6 carbon atoms, for example methyl or ethyl, or can be phenyl. It is particularly preferred that at least 80%, most preferably substantially all, R'' groups present are methyl groups. The resin may be a trimethyl-capped resin. Other hydrocarbon groups may also be present, e.g. alkenyl groups present for example as dimethylvinylsilyl units, most preferably not exceeding 5% of all R'' groups. Silicon bonded hydroxyl groups and/or alkoxy, e.g. methoxy, groups may also be present.

The organosilicon resin is preferably present in the antifoam at 1-50% by weight based on the polydiorganosiloxane fluid, particularly 2-30% and most preferably 4-15%. The organosilicon resin may be soluble or insoluble in the polysiloxane fluid. If the resin is insoluble in the polysiloxane fluid, the average particle size of the resin may for example be from 0.5 to 400 μm, preferably 2 to 50 μm. The resin (C) can alternatively be added into the foam control agent in the form of solid particles, for example spray dried particles.

The foam control composition of the invention can additionally contain a hydrophobic organic liquid as an auxiliary foam control agent, for example a mineral oil, especially hydrogenated mineral oil or white oil, liquid polyisobutene, an isoparaffinic oil or petroleum jelly. The weight ratio of organopolysiloxane fluid to hydrophobic organic liquid can for example be 100/0 to 10/90, preferably 70/30 to 20/80.

The foam control compositions according to the invention may be made by combining the polydiorganosiloxane fluid and the non-polar component (A) and the more polar component (B) of the additive composition, and the hydrophobic filler and/or the organosilicon resin if used, in any convenient way. The polysiloxane fluid, the hydrophobic filler and the organosilicon resin if used are preferably mixed together under shear. Where the filler needs to be made hydrophobic in situ, the manufacturing process includes a heating stage, preferably under reduced pressure, in which the filler and the treating agent are mixed together in part or all of polysiloxane fluid, in the presence of a suitable catalyst if required. The components (A) and/or (B) can be premixed with the fluid before mixing with the filler and resin, or (A) and (B) can be subsequently mixed, together or separately, with the foam control agent comprising fluid, filler and resin.

The foam control composition of the present invention is preferably supported on a particulate carrier, particularly when the composition is to be used in a powdered product such as a detergent powder. Examples of carriers and/or supports are zeolites, for example Zeolite A or Zeolite X, other aluminosilicates or silicates, for example magnesium silicate, phosphates, for example powdered or granular sodium tripolyphosphate, sodium sulphate, sodium carbonate, for example anhydrous sodium carbonate or sodium carbonate monohydrate, sodium perborate, a cellulose derivative such as sodium carboxymethylcellulose, granulated starch, clay, sodium citrate, sodium acetate, sodium bicarbonate, sodium sesquicarbonate and native starch. We have found that in addition to improving foam control efficiency, the additives comprising triglycerides and other polyol esters improve the stability of the foam control granules, especially granules based on a sodium carbonate carrier.

Each of the components (A) and (B) can be mixed with the foam control agent comprising fluid and optionally filler and/or resin before being deposited on the carrier. Most preferably, the polysiloxane fluid containing the hydrophobic filler and optionally the organosilicon resin is mixed with the additive composition and the mixture is deposited on the carrier particles in non-aqueous liquid form. The mixture is preferably deposited on the carrier particles at a temperature at which the additive composition is liquid, for example a temperature in the range 40-100° C. As the mixture cools on the carrier particles, it solidifies to a structure having partially separated phases which contributes to the increased efficiency of the foam control composition. In an alternative process, the polysiloxane fluid, the hydrophobic filler, the organosilicon resin if present and the additive composition are emulsified in water and the resulting aqueous emulsion is deposited on the carrier particles. The supported foam control composition is preferably made by an agglomeration process in which the foam control composition is sprayed onto the carrier particles while agitating the particles. The particles are preferably agitated in a high shear mixer through which the particles pass continuously. In one preferred process, the particles are agitated in a vertical, continuous high shear mixer in which the foam control composition is sprayed onto the particles. One example of such a mixer is a Flexomix mixer supplied by Hosokawa Schugi.

The supported foam control composition may additionally include a water-soluble or water-dispersible binder to improve the stability of the particles. Many of the components (A) and (B) of the additive composition according to the invention act as binders to some extent but a further binder can be added to provide extra handling stability if required. Examples of binders are polycarboxylates, for example polyacrylic acid or a partial sodium salt thereof or a copolymer of acrylic acid, for example a copolymer with maleic anhydride, polyoxyalkylene polymers such as polyethylene glycol, which can be applied molten or as an aqueous solution and spray dried, reaction products of tallow alcohol and ethylene oxide, or cellulose ethers, particularly water-soluble or water-swellable cellulose ethers such as sodium carboxymethylcellulose, or sugar syrup binders such as Polysorb 70/12/12 or LYCASIN 80/55 HDS maltitol syrup or Roclys C1967 S maltodextrin solution. The water-soluble or water-dispersible binder can be mixed with the foam control composition before being deposited on the carrier, but preferably is separately deposited on the carrier particles. In one preferred procedure the foam control composition is deposited on the carrier particles as a non-aqueous liquid at a temperature in the range 40-100° C. and the water-soluble or water-dispersible binder is at the same time or subsequently, or at both times, deposited on the carrier from a separate feed as an aqueous solution or dispersion.

The supported foam control composition may optionally contain a surfactant to aid dispersion of the foam control composition in the binder and/or to help in controlling the "foam profile", that is in ensuring that some foam is visible throughout the wash without overfoaming. Examples of surfactants include silicone glycols, or fatty alcohol ether sulphate or linear alkylbenzene sulphonate, which may be preferred with a polyacrylic acid binder. The surfactant can be added to the foam control composition undiluted before the silicone is deposited on the carrier, or the surfactant can be added to the binder and deposited as an aqueous emulsion on the carrier.

The foam control composition can alternatively be provided in the form of an oil-in-water emulsion using any of the surfactants described in EP-A-1075684. Alternatively the foam control agent can be provided as a water-dispersible composition in a water-dispersible vehicle such as a silicone glycol or in another water-miscible liquid such as ethylene glycol, polyethylene glycol, propylene glycol, a copolymer of ethylene glycol and propylene glycol, an alcohol alkoxylate, an alkoxyalkanol or hydroxyalkyl ether or an alkylphenol alkoxylate.

The foam control compositions of the invention can contain additional ingredients such as a density adjuster, a colour preservative such as a maleate or fumarate, e.g. bis(2-methoxy-1-ethyl)maleate or diallyl maleate, an acetylenic alcohol, e.g. methyl butynol, cyclooctadiene, or cyclic methyl vinyl siloxane which reacts with any residual Pt catalyst present, a thickening agent such as carboxymethyl cellulose, polyvinyl alcohol or a hydrophilic or partially hydrophobed fumed silica, or a colouring agent such as a pigment or dye.

The foam control agents according to this invention are useful for reducing or preventing foam formation in aqueous systems, particularly foam generated by detergent compositions during laundering, and are particularly useful in detergent compositions which have a high foaming characteristic, for example those based on high levels of anionic surfactants, e.g. sodium dodecyl benzene sulphonate to ensure effectiveness of detergent composition at lower washing temperatures, e.g. 40° C.

The following examples illustrate the invention. All parts and percentages are expressed by weight unless otherwise stated. The foam control agents may also be employed in such processes as paper making and pulping processes, textile dyeing processes, cutting oil, coatings and other aqueous systems where surfactants may produce foam.

EXAMPLE 1

6% by weight treated precipitated silica (Sipemat® D10) and 1% R972 partially hydrophobic silica (both supplied by Degussa) were dispersed in 86.3% polydiorganosiloxane fluid having a degree of polymerisation of 60 and comprising 79 mole % methyl ethyl siloxane groups, 20 mole % methyl 2-phenylpropyl (derived from α-methylstyrene) siloxane groups and 1 mole % divinyl crosslinking groups. The mean number of carbon atoms in the groups R in the polydiorganosiloxane is 2.2. 6.7% by weight of a 60% by weight solution of an organosiloxane resin having trimethyl siloxane units and $SiO_2$ units in a M/Q ratio of 0.65/1 in octyl stearate was added. The mixture was homogenised through a high shear mixer to form a foam control compound FC1.

15 parts by weight FC1 was mixed at 80° C. with an additive composition comprising 11.9 parts glyceryl monostearate (GMS; 90% pure) and 4.0 parts glyceryl tristearate (GTS). The resulting liquid mixture was sprayed onto 69 parts by weight sodium carbonate powder in a granulating mixer to produce a supported foam control composition.

EXAMPLES 2 TO 5

Supported foam control compositions were produced as described in Example 1 using various proportions of GMS and GTS, as shown in Table 1.

EXAMPLE 6

A supported foam control composition was produced as described in Example 1 using as the additive composition 15 parts of a mixture of 16% by weight GTS with 36% GMS and 48% glyceryl distearate (GDS).

EXAMPLE 7

Example 1 was repeated using as the additive 12.9 parts of the fatty acid amide sold under the Trade Mark 'Crodamide OR' and 2.25 parts GTS.

EXAMPLES 8 TO 10

Example 6 was repeated using lower amounts of the GTS/GMS/GDS mixture while keeping the silicone antifoam level constant, as shown in Table 1.

EXAMPLE 11

Example 6 was repeated using a zeolite carrier in place of the sodium carbonate carrier. The results are shown in Table 1.

Comparative Examples C1 to C3

Comparative Example C1 was produced by the process of Example 1 but using PEG 4000 polyethylene glycol binder in place of the additive mixture of GMS 90 and GTS used in Example 1. Comparative Examples C2 and C3 were produced by the process of Example 1 but using GMS 90 alone (C2) or GTS alone (C3) in place of the additive mixture of GMS and GTS used in Example 1.

Comparative Tests

Example and comparative foam control agents were tested in a commercial powder detergent formulation based on anionic and nonionic surfactants. Each supported foam control composition was used at 0.5% by weight of the detergent powder (0.07% by weight FC1 based on detergent powder). The evaluation was made in a Miele 934 front loading washing machine, loaded with 16 cotton towels, 100 g of the detergent formulation, 17 litres of water of 9 degree German hardness using a wash cycle of 42 minutes and 4 rinses R1 to R4 at 40° C. The foam height was measured every 5 minutes during the wash cycle and recorded, where the value indicated is the foam height in the washing machine, with 100% referring to the fact that the window of the machine was full of foam, 50%, that is was half full of foam. The results are described in Table 1 below.

TABLE 1

| Example | Carrier | Binder | Additive | Foam Control Compound | 5 | 10 | 15 | 20 | 25 | 30 | 35 | 40 | 42 |
|---|---|---|---|---|---|---|---|---|---|---|---|---|---|
| C1 | 70% Sodium carbonate | 15% PEG 4000 | None | 15% FC1 | 20 | 40 | 50 | 60 | 80 | 90 | 100 | 100 | 100 |
| C2 | 70.2% Sodium carbonate | None | 14.4% GMS | 15.4% FC1 | 0 | 0 | 20 | 40 | 50 | 60 | 80 | 100 | 100 |
| C3 | 70.7% Sodium carbonate | None | 14.9% GTS | 14.4% FC1 | 60 | 60 | 50 | 70 | 70 | 80 | 90 | 90 | 100 |
| 1 | 69.2% Sodium carbonate | None | 11.9% GMS + 4% GTS | 14.9% FC1 | 40 | 10 | 20 | 20 | 30 | 40 | 60 | 60 | 70 |
| 2 | 70.5% Sodium carbonate | None | 12.9% GMS + 2.3% GTS | 14.3% FC1 | 0 | 0 | 0 | 10 | 10 | 20 | 30 | 40 | 40 |
| 3 | 70.5% Sodium carbonate | None | 13.3% GMS + 1.9% GTS | 14.3% FC1 | 10 | 10 | 0 | 0 | 10 | 20 | 30 | 40 | 50 |
| 4 | 70.6% Sodium carbonate | None | 13.7% GMS + 1.5% GTS | 14.2% FC1 | 10 | 30 | 20 | 10 | 20 | 40 | 50 | 50 | 60 |
| 5 | 71.05% Sodium carbonate | None | 14.1% GMS + 0.75% GTS | 14.1% FC1 | 0 | 20 | 10 | 20 | 30 | 50 | 60 | 60 | 70 |
| 6 | 70.7% Sodium carbonate | None | 5.4% GMS + 7.2% GDS + 2.4% GTS | 14.3% FC1 | 20 | 13 | 7 | 13 | 20 | 33 | 37 | 47 | 50 |
| 7 | 70.45% Sodium carbonate | None | 2.25 GTS + 12.9% Crodamide OR | 14.4% FC1 | 0 | 10 | 20 | 30 | 40 | 60 | 60 | 70 | 70 |
| 8 | 74.4% Sodium carbonate | None | 4.1% GMS + 5.5% GDS + 1.9% GTS | 14.1% FC1 | 10 | 20 | 0 | 0 | 10 | 40 | 40 | 40 | 50 |
| 9 | 78.5% Sodium carbonate | None | 2.7% GMS + 3.6% GDS + 1.2% GTS | 14% FC1 | 0 | 0 | 10 | 10 | 10 | 20 | 30 | 40 | 50 |
| 10 | 80.6% Sodium carbonate | None | 1.8% GMS + 2.4% GDS + 0.8% GTS | 14.3 FC1 | 0 | 0 | 0 | 0 | 10 | 30 | 40 | 50 | 50 |
| 11 | 69.4% Zeolite | None | 5.6% GMS + 7.6% GDS + 2.5% GTS | 14.9% FC1 | 60 | 60 | 20 | 0 | 0 | 20 | 50 | 60 | 60 |

The improvement given by the additive compositions of the invention can be seen by comparing the maximum foam height for each of the Examples of the invention with the maximum foam height of 100% in each of the comparative experiments. The comparative foam control compositions C1, C2 and C3 are themselves highly effective foam control agents, but the level of 0.07% by weight FC1 based on detergent powder is extremely low for a detergent with such a high surfactant content.

EXAMPLE 12

13.88 parts by weight FC1 was mixed at 120° C. with 6.46 parts Crodamide SR fatty acid amide and 1.13 parts glyceryl tristearate and was deposited on 78.53 parts starch granules. When wash tests were carried out using this supported foam control composition at 0.115% FC1 in the detergent composition described in Examples 1-11, no foam at all was seen in a wash test at 40° C. or in a wash test at 95° C. By comparison, when C1 was used at 0.115%, a maximum foam height of 70 was seen in the wash test at 40° C. and a maximum foam height of 60 was seen in the wash test at 95° C.

EXAMPLE 13

8.0 parts by weight FC1 was mixed at 80° C. with 1.55 parts GMS, 2.07 parts GDS and 0.69 parts GTS and was deposited on 87.7 parts sodium bicarbonate powder using the procedure of Example 1 to produce a granulated foam control agent. When wash tests were carried out using this granulated foam control agent at 0.075% in the detergent composition described above, the maximum foam height was 60 in a wash test at 40° C.

The invention claimed is:
1. A granulated foam control composition comprising:
 (i) a foam control agent comprising;
  a polydiorganosiloxane fluid comprising units of the formula

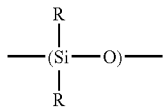

where each group R, which may be the same or different, is selected from an alkyl group having 1 to 36 carbon atoms or an aryl group or aralkyl group having up to 36 carbon atoms, the mean number of carbon atoms in the groups R being at least 1.3;
  a hydrophobic filler dispersed in the polydiorganosiloxane fluid; and
  optionally an organosilicon resin; and
 (ii) an additive composition having a melting point of at least 35° C. comprising:
  5-50 parts by weight of a glycerol triester (A) which is esterified by carboxylate groups each having 7 to 36 carbon atoms, wherein at least 90% of the hydroxyl groups of the glycerol triester are esterified; and
  50-95 parts by weight of a mixture of monoesters and diesters of glycerol (B) which is miscible with component (A) and is more polar than component (A), at least one of (A) and (B) being miscible with the polysiloxane fluid wherein the foam control agent (i) and the additive composition (ii) are supported on a particulate carrier with the proviso that a mixture of (i) and (ii) is deposited onto the particulate carrier in non-aqueous liquid form.

2. A foam control composition according to claim 1, characterized in that the polydiorganosiloxane fluid is a polysiloxane comprising at least 10% diorganosiloxane units of the formula

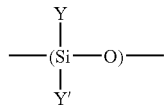

and up to 90% diorganosiloxane units of the formula

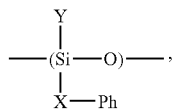

wherein X denotes a divalent aliphatic organic group bonded to silicon through a carbon atom;
Ph denotes an aromatic group; Y denotes an alkyl group having 1 to 4 carbon atoms; and Y' denotes an aliphatic hydrocarbon group having 1 to 24 carbon atoms with the proviso that the mean number of carbon atoms in the coups R is at least 1.3.

3. A foam control composition according to claim 1, characterized in that the polydiorganosiloxane fluid is a polysiloxane comprising 50-100% diorganosiloxane units of the formula

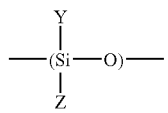

and optionally up to 50% diorganosiloxane units of the formula

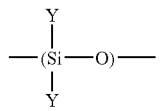

wherein Y denotes an alkyl group having 1 to 4 carbon atoms and Z denotes an alkyl group having 6 to 18 carbon atoms.

4. A foam control composition according to claim 1, characterized in that (A) is a glycerol triester esterified by carboxylate groups each having 14 to 22 carbon atoms.

5. A foam control composition according to claim 1, characterized in that (B) is a mixture of mono-esters and di-esters of glycerol having 8 to 30 carbon atoms.

6. A foam control composition according to claim 5, characterized in that the additive composition comprises 10-50 pans by weight glycerol tristearate and 50-90 pans by weight glycerol monostearate and glycerol distearate.

7. A foam control composition according to claim 1, characterized in that the organosilicon resin is a siloxane resin consisting of monovalent trihydrocarbonsiloxy (M) groups of the formula $R''_3SiO_{1/2}$ and tetrafunctional (Q) groups $SiO_{4/2}$ wherein R'' denotes an alkyl group and the number ratio of M groups to Q groups is in the range 0.4:1 to 1.1:1.

8. A foam control composition according to claim 1, characterized in that the hydrophobic filler has an average particle size of from 0.5 to 30 μm.

9. A foam control composition according to claim 1, characterized in that the additive composition is present at 20-200% by weight based on the polysiloxane fluid.

10. A granulated foam control agent according to claim 1, characterized in that a water-soluble or water-dispersible binder is also supported on the particulate earner.

11. A method of manufacturing a granulated foam control composition comprising:
mixing:
(i) a foam control agent comprising:
a polydiorganosiloxane fluid comprising units of the formula

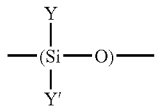

where each group R, which may be the same or different, is selected from an alkyl group having 1 to 36 carbon atoms or an aryl group or aralkyl group having up to 36 carbon atoms, the mean number of carbon atoms in the groups R being at least 1.3;

a hydrophobic filler dispersed hi the polydiorganosiloxane fluid; and optionally an organosilicon resin; and (ii) an additive composition having a melting point of at least 35° C. comprising:

5-50 pans by weight of a glycerol triester (A) which esterified by carboxylate groups each having 7 to 36 carbon atoms, wherein at least 90% of the hydroxyl groups of the glycerol triester are esterified; and 50-95 parts by weight of a mixture of monoesrers and diesters of glycerol (B) which is miscible with component (A) and is more polar than component (A), at least one of (A) and (B) being miscible with the polysiloxane fluid; and depositing the mixture of (I) and (ii) on a particulate carrier with the proviso that the mixture of (i) and (ii) is in non-aqueous liquid form prior to depositing it onto the particulate cater.

12. A method according to claim 11, wherein the glycerol triester (A) is a glycerol triester esterified by carboxylate around each having 14 to 22 carbon atoms.

13. A method according to claim 12, wherein component (B) is a mixture of mono-esters and di-esters of having 8 to 30 carbon atoms.

* * * * *